Patented Mar. 1, 1932

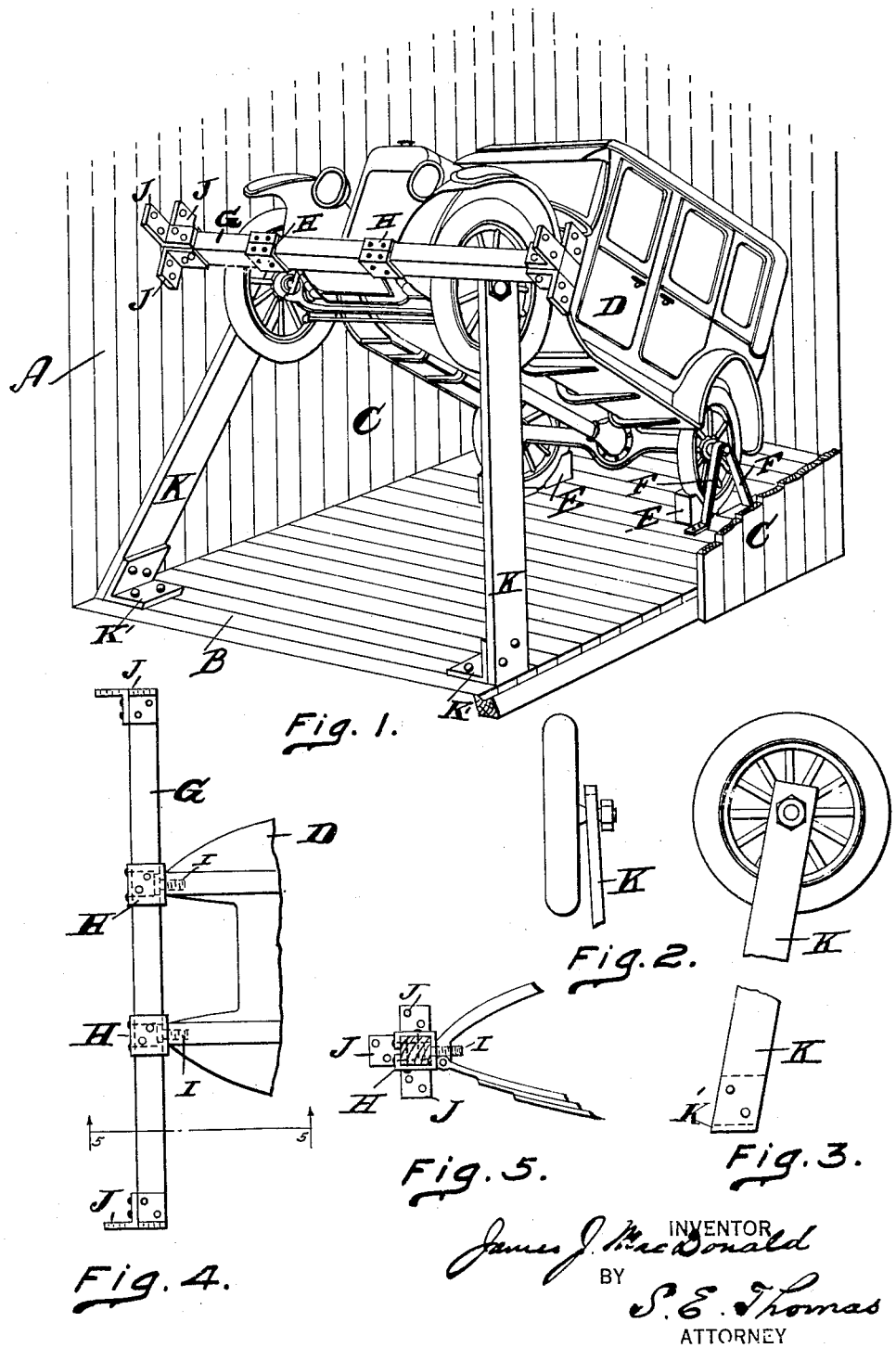

1,847,405

UNITED STATES PATENT OFFICE

JAMES J. MacDONALD, OF DETROIT, MICHIGAN

AUTOMOBILE DECKING MEANS FOR FREIGHT CARS

Application filed September 19, 1929. Serial No. 393,609.

My invention relates to means for semi-decking motor driven vehicles in railway freight cars for shipment.

The object of the present invention is the employment of a simple inexpensive bracing structure which may be readily applied and used on freight cars of varying dimensions.

A further object of the invention is to provide means for supporting an automobile in such manner as to prevent damage to the vehicle while affording more clearance than present methods admit for locating another vehicle beneath, in what is known as the "half or semi-decking" relation, wherein the vehicles are arranged in a longitudinally inclined position with one pair of wheels—usually the rear wheels of the vehicle—secured in a cradle or chock by a suitable hold-down device to the floor, the other pair of wheels being elevated.

The forward end of the automobile is supported and held against movement by a horizontal member attached to the frame of the vehicle and to the side walls of the freight car;—additional support being supplied by two diagonally disposed members secured to the axles or hubs of the vehicle from which they extend at an angle outwardly and downwardly to the side walls and floor of the freight car, bracing the vehicle to resist motions in directions both longitudinally and transversely of the car.

Automobiles so supported, may be disposed relatively to each other in the freight car in various ways, the selection depending somewhat on the size and type of the automobile.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a perspective view showing the interior of a portion of a freight car, with an automobile secured therein in a "half or semi-decked" position.

Figure 2 is a fragmentary edge view of one of the supporting standards or struts, sleeved upon the end of the forward axle, showing it secured thereon by a nut.

Figure 3 is a fragmentary side elevation of the standard shown in the preceding figure, attached to a vehicle wheel.

Figure 4 is an inverted fragmentary view of an automobile frame showing a horizontally disposed member secured to the frame, fitted at its outer ends with means for securing the same to the walls of a freight car.

Figure 5 is a fragmentary detail and cross-sectional view taken on or about line 5—5 of Figure 4.

Referring now to the letters of reference placed upon the drawings:

A denotes a freight car, in which B indicates the floor and C the side walls of the car.

As shown in the drawings, the automobile D is "semi-decked", its rear wheels resting in cradles or chocks E, secured to the floor B of the car. Suitable hold-down devices F, F engaging the rear axle are employed to secure the wheels in the chocks and to the floor of the car.

G denotes a horizontally disposed member fitted with clips H, H from which extend bolts I, I adapted to enter holes provided in the forward, downwardly bent ends of the frame, and to which they are secure, upon first removing the usual bumper, attached to the frame at these points.

J, J denote angle plates secured to the four sides of the horizontal member G, at each end of the latter, for attachment to the side walls C of the car.

To further assist in supporting and bracing the forward end of the vehicle, a pair of upright members K, K are provided, fitted with angle-shaped floor plates $K^1$ at their lower ends, for attachment to the car floor. These members K, K extend upwardly and rearwardly from a corner formed by the side walls with the floor of the car to the ends of the forward axles to which they are fitted;— the hub caps having been first removed and then replaced,—that they may overlap the members K, K to prevent accidental release.

Not only do the standards K, K extend upwardly to the front axles of the vehicle from the corners formed by the floor and side walls of the car but they incline longitudinally, and transversely toward the forward axle to which they are secured. They are thus positioned to resist lateral and longitudinal movement of the automobile relative to the car.

Having thus described my invention, what I claim is:

1. In combination with a railway freight car, a loading structure for automobiles comprising means secured to the freight car floor to receive the rear wheels of the vehicle, whereby said vehicle may be swung upwardly above its axle, suitable hold-down means secured to the floor, adapted to engage the rear axle at each end; and a horizontal transverse supporting member secured to the forward end of the vehicle frame and to the side walls of the freight car.

2. A structure as specified in claim 1 in combination with a pair of rearwardly inclined members projecting upwardly and inwardly from the floor and adjacent the side walls of the freight car, with an opening adjacent their upper ends to receive the ends of the forward axle; and means for securing the lower ends of said members to the floor of the freight car.

3. In combination with a railway freight car; an automobile loading structure, comprising means for receiving the rear wheels of the vehicle, whereby the vehicle may be swung upwardly above its rear axle; suitable hold-down devices for securing said rear wheels to the floor; and a transverse member bolted to the forward end of the chassis frame fitted with angle plates at each end for engagement with the side walls of the car.

4. The combination with a freight car and automobiles having chassis frames provided with means to accommodate the attachment of bumpers, of means adapted to be secured to said chassis when the bumpers are removed therefrom for the purpose of securing said automobiles against movement in said freight car.

5. The combination with a freight car and automobiles having chassis frames provided with spring horns adapted to accommodate the attachment of bumpers, of means adapted to be attached to said spring horns when said bumpers are removed therefrom for the purpose of securing said automobiles against movement in said freight car.

6. The combination with a freight car and automobiles having chassis frames provided with spring horns adapted to accommodate the attachment of bumpers, of cross beams adapted to be attached to said spring horns when said bumpers are removed, said cross beams being adapted to engage the side walls of said freight car.

7. The combination with a freight car and automobiles having chassis frames provided with spring horns adapted to accommodate the attachment of bumpers, of cross beams adapted to be attached to said spring horns when said bumpers are removed, said cross beams being adapted to engage the side walls of said freight car, and means secured to the walls of said freight car for securing said beams against movement.

8. The combination with a freight car and automobiles having chassis frames provided with spring horns adapted to accommodate the attachment of bumpers, of cross beams adapted to be attached to said spring horns when said bumpers are removed, said cross beams being adapted to engage the side walls of said freight car, and blocks secured to the side walls of said freight car and adapted to prevent movement of said beam.

9. The combination with a freight car and automobiles contained therein, of cross beams secured to the chassis of said automobiles, said cross beams being adapted to engage the side walls of said freight car to prevent lateral movement of said automobiles within said freight car.

10. The combination with a freight car and automobiles contained therein, of cross beams secured to the chassis of said automobiles, said cross beams being adapted to engage the side walls of said freight car to prevent lateral movement of said automobiles within said freight car, and means secured to the walls of said freight car for preventing movement of said cross beams.

11. The combination with a freight car and automobiles contained therein, of cross beams secured to the chassis of said automobiles, said cross beams being adapted to engage the side walls of said freight car to prevent lateral movement of said automobiles within said freight car, and blocks secured to the walls of said freight car for preventing movement of said cross beams.

12. Securing means for automobiles having spring horns adapted to accommodate the attachment of bumpers, said securing means comprising a cross beam adapted to be attached to said spring horns when said bumpers are removed.

In testimony whereof, I sign this specification.

JAMES J. MacDONALD.